OLE K. NILSSEN
INVENTOR

BY John R. Faulkner
Glenn S. Arendsen
ATTORNEYS

OLE K. NILSSEN
INVENTOR

BY John R. Faulkner
Glenn S. Arendsen
ATTORNEYS

United States Patent Office 3,440,398
Patented Apr. 22, 1969

3,440,398
CONTROL CIRCUIT FOR AN ELECTRIC HEATING SYSTEM USED IN AUTOMOTIVE VEHICLES
Ole K. Nilssen, Livonia, Mich., assignor to Ford Motor Company, Dearborn, Mich., a corporation of Delaware
Filed Jan. 30, 1967, Ser. No. 612,453
Int. Cl. B60l 1/02
U.S. Cl. 219—279                                9 Claims

ABSTRACT OF THE DISCLOSURE

A control circuit for an electric heating system for automotive vehicles that uses the unregulated operation of an electric generator to supply power to a heating element. A temperature sensitive switch in series with a voltage regulating relay switches the generator into a regulated or a nonregulated state. In parallel with the temperature sensitive switch is a manually actuated switch that is operated by the vehicle driver to switch the temperature sensitive switch into and out of a controlling relationship with the voltage regulating relay. If desired, a thermistor can be positioned in parallel with the temperature sensitive switch to coordinate the amount of heat supplied by the electric heating element with the amount of heat supplied by the engine cooling system.

SUMMARY OF THE INVENTION

Automobiles conventionally use excess heat from the engine cooling system to warm the passenger compartment. Almost all engine cooling systems, however, do not produce a significant amount of heat during the first five to ten minutes of operation. The electric heating systems described in U.S. Ser. No. 350,142, now U.S. Patent 3,300,619 and Ser. No. 350,938, now U.S. Patent 3,264,450 use the unregulated operation of the electric generator during the period before warm air is available from the cooling system to produce heat for the passenger compartment. In each of these heating systems, the generator is switched to a regulated state and the electric heating element is disconnected by an electric solenoid responsive to a temperature sensitive switch. While the systems are feasible, their control circuits require a considerable amount of extra hardware including a solenoid, several switches ganged for operation by the solenoid and, in one system, a redesigned voltage regulator. The additional hardware, of course, increases significantly the cost of the heating systems.

The control circuit provided by this invention requires as additional hardware only a temperature sensitive switch and a manually actuated switch. In an electric heating system for a vehicle having an electric generator, a chargeable electric storage means, a regulator having a voltage regulating relay capable of regulating the output of the generator, and an electric heating element, the control circuit of this invention comprises a temperature sensitive switch for switching the generator between a regulated and a nonregulated state and a manually actuated switch for switching the temperature sensitive switch into and out of a controlling relationship with the generator. The temperature sensitive switch is in series with the voltage regulating relay of the regulator, and the manually actuable switch preferably is in parallel with the temperature sensitive switch.

It is not necessary to disconnect the electric heating element from the generator output when the control circuit of this invention switches the generator to its regulated state since the amount of heat produced by the electric heating element then is low compared to the amount of heat realized from the engine cooling system. When a reduced amount of heat is required in the passenger compartment, however, it is desirable to disconnect the electric heating element from the generator output, and ganged switches can be linked to the temperature control lever operated manually by the vehicle driver for this purpose. The ganged switches connect the electric heating element to the generator output when the temperature control lever is moved to its maximum heat position and disconnect the electric heating element when the temperature control lever is moved out of the maximum heat position.

In an alternate embodiment of the control circuit of this invention, a thermistor is connected in parallel with the temperature sensitive switch. The thermistor is a temperature sensitive resistor having a decreased resistance at higher temperatures. Where the vehicle has an engine coolant heating element anterior to the electric heating element, the thermistor can be located anterior to the electric heating element and posterior to the engine coolant heating element. As engine coolant begins to supply heat, the resistance of the thermistor decreases to switch gradually the generator from its nonregulated to a regulated state. Heat from the electric element then is coordinated with heat from the engine coolant to produce an output air stream having a constant temperature. If desired, the thermistor can be located anterior to the electric heating element where the thermistor will serve additionally as a safety device switching the generator to its regulated state in the event of overheating.

DETAILED DESCRIPTION

Figure 1:
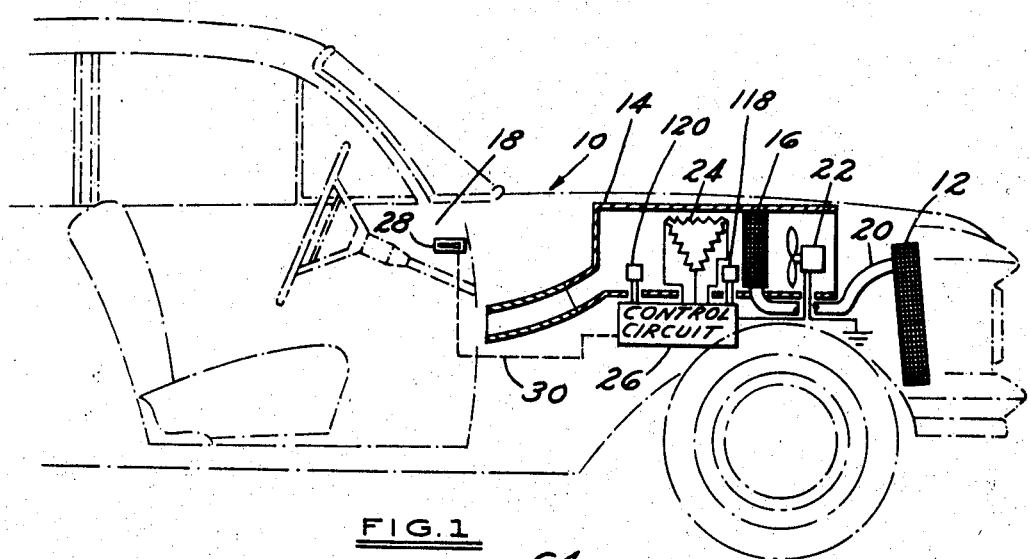
FIGURE 1 is a side view of an automobile showing schematically the installation of a quick heat system using the control circuit of this invention.

Referring to FIGURE 1, an automobile body 10 has located therein a radiator 12 for cooling the engine (not shown). A heater chamber 14 is positioned in body 10 and contains the engine coolant heating element 16. Chamber 14 communicates with the vehicle passenger compartment 18 at one end and is open at the other end. Heating element 16 receives engine coolant from the engine cooling system via hose 20. An electric fan 22 is positioned in chamber 14 to force air through heating element 16 and into passenger compartment 18.

Chamber 14 also contains an electric heating element 24 positioned posterior to heating element 16. A control circuit 26 is connected electrically to fan 22 and heating element 24 and mechanically to a temperature control 28. Temperature control 28 is located in passenger compartment 18. Dashed line 30 represents the mechanical connection between control 28 and circuit 26, which typically is a Bowden cable assembly.

Figure 2:
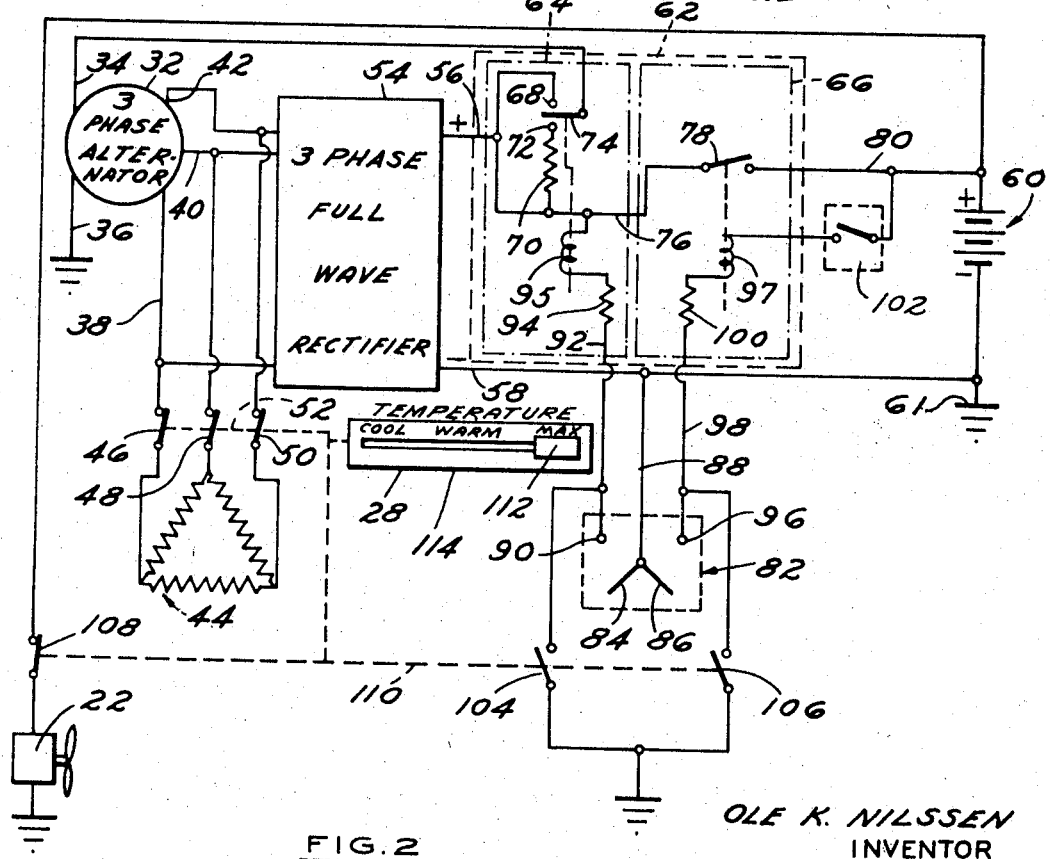
FIGURE 2 is a schematic diagram of a heating system using the control circuit of this invention. Included is a view of the manually operated temperature control that is positioned in the passenger compartment for operation by the vehicle driver.

Control circuit 26 is shown schematically in FIGURE 2. In FIGURE 2 a three phase alternator 32, the electric generator, is driven by the engine by conventional means (not shown). Leads 34 and 36 are connected to the field winding of alternator 32 and leads 38, 40 and 42 are connected to the output windings of alternator 32. Leads 38, 40 and 42 are connected to the corners of a delta-shaped electric heating element 44 through switches 46, 48 and 50, respectively. Dashed line 52 represents a ganged connection between switches 46, 48 and 50.

Leads 38, 40 and 42 also are connected to a three phase full wave rectifier 54. Rectifier 54 can be any of the conventional rectifiers such as a bridge-type rectifier or a center tap transformer and it rectifies the output of alternator 32 into a DC output that is positive at lead 56 and a negative at lead 58. Lead 58 is connected to the negative terminal of a battery 60, a chargeable electric storage means. The negative terminal of battery 60 is connected to ground at 61.

A voltage regulator is enclosed by dashes 62. Regulator 62 has a voltage regulating relay enclosed by dashes 64 and a battery connecting relay enclosed by dashes 66. In regulating relay 64, lead 56 is connected directly to an upper contact 68 and through a resistor 70 to a lower contact 72. Lower contact 72 is positioned adjacent upper contact 68 and is spaced therefrom by a small gap. An arm 74 is positioned in this gap and is movable between contacts 68 and 72. Arm 74 is connected to lead 34 of the alternator field winding, and lead 36 of the field winding is connected to ground.

A lead 76 connects lead 56 with a battery connecting switch 78 that is a part of connecting relay 66. Switch 78 in turn is connected by a lead 80 to the positive terminal of battery 60.

A temperature sensitive switch that is open at low temperatures and closed at higher temperatures is enclosed by dashed line 82. Switch 82 contains a voltage regulating switch element 84 and a battery connecting switch element 86. Elements 84 and 86 are connected by a lead 88 to lead 58 and thereby to the negative terminal of battery 60. Element 84 moves into and out of touch with a contact 90 that is connected through a lead 92 and a resistor 94 to one side of a relay coil 95 of voltage regulating relay 64. The other side of coil 95 is connected to lead 76.

Battery connecting switch element 86 moves into and out of touch with a contact 96 that is connected by a lead 98 and a resistor 100 to one side of a relay coil 97 of battery connecting relay 66. The other side of relay coil 97 is connected through an ignition switch 102 to lead 80 and thereby to the positive terminal of battery 60. Coil 95 exerts a magnetic force on arm 74 and coil 97 exerts a magnetic force on the arm of battery connecting switch 78 when an electric current exists in the respective coil.

A switch 104 is connected between lead 92 and ground and a similar switch 106 is connected between lead 98 and ground. Fan motor 22 is connected through a switch 108 to the positive terminal of battery 60, and dashed line 110 represents a mechanical ganged connection between switches 104, 106 and 108.

Temperature control 28 comprises a lever 112 movable in a bezel 114 from a cool position at one end through a warm position to a maximum heat (max) position. Lever 112 controls a conventional valve (not shown) permitting engine coolant to flow through heating element 16 in a conventional manner. In addition, lever 112 is linked mechanically to connection 52 ganging switches 46, 48 and 50 and to connection 110 ganging switches 104, 106 and 108. When lever 112 is moved to its max position, switches 46, 48 and 50 are closed, switches 104 and 106 are opened, and switch 108 is closed. These are the positions shown in FIGURE 2. At all other positions of lever 112 switches 46, 48, 50 and 108 are open and switches 104 and 106 are closed. These are the positions shown in FIGURE 3.

Figure 3:
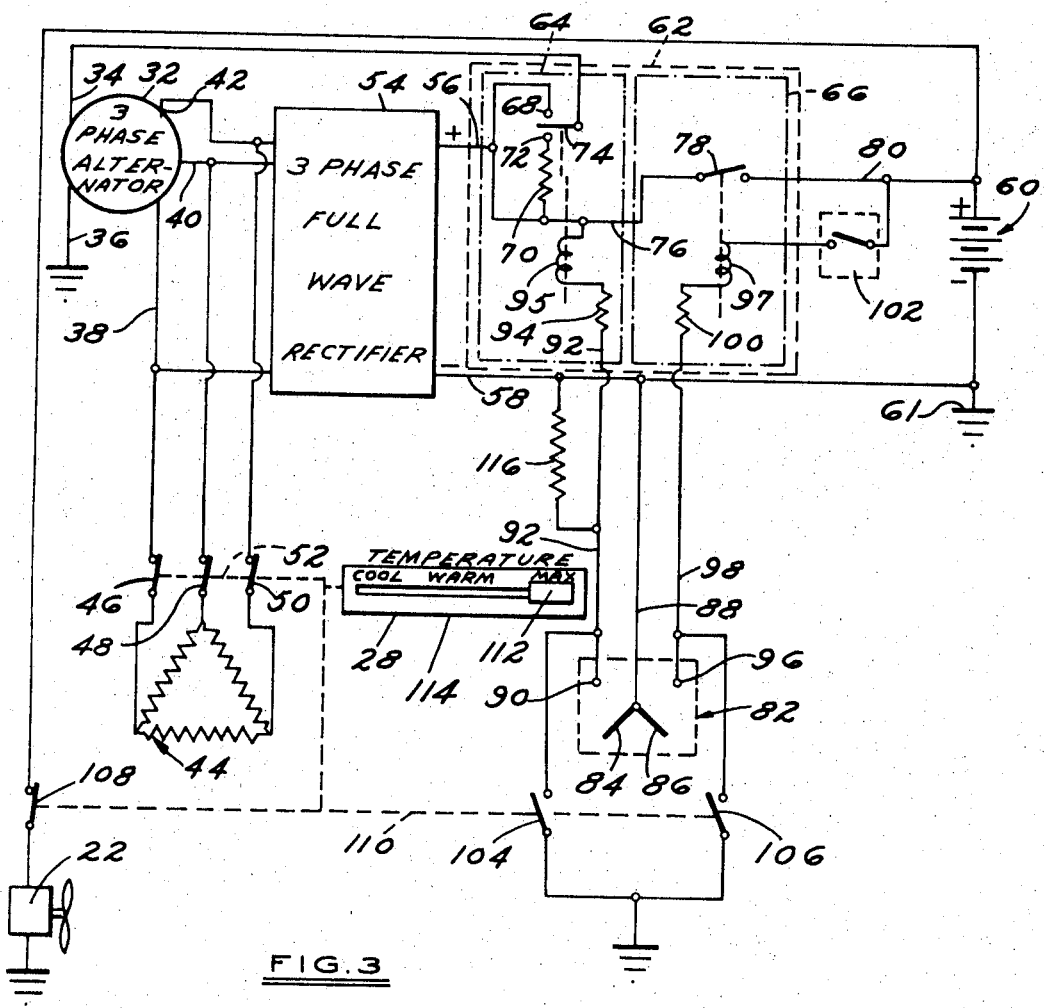
FIGURE 3 is a schematic diagram of an alternate embodiment of the control circuit that uses a thermsistor to coordinate the heat supplied by the electric heating element with heat supplied by the engine cooling system.

FIGURE 3 is otherwise identical to FIGURE 2 except that a thermistor 116 is connected between lead 58 and lead 92 where it is in parallel with voltage regulating switch element 84. The resistance of thermistor 116 falls as its temperature rises. Switch 82 can be located either in box 118, which is between heating elements 16 and 24 (see FIGURE 1), or in box 120, which is posterior to heating element 24. Thermistor 116 is located in box 118 in FIGURE 1.

Figure 4:
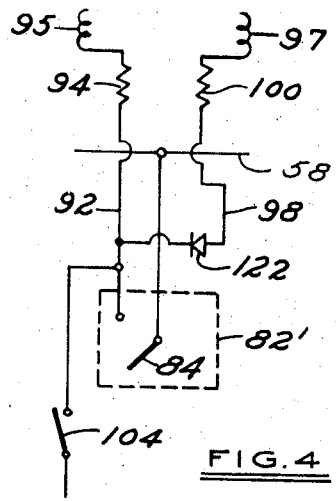
FIGURE 4 shows an alternate circuit in which the temperature sensitive switch has a single switch element.

In FIGURE 4, temperature sensitive switch 82 is replaced by a switch 82' having a single switch element 84. A diode 122 has its anode connected to lead 98 and its cathode connected to lead 92.

OPERATION

When arm 74 is touching contact 68, alternator 32 operates in an unregulated manner producing a high output. This is the normal position of arm 74. Regulation occurs when a current exists in coil 95 and magnetically produces a force on arm 74 causing arm 74 to vibrate between contact 68 and an open position. The average current through the alternator field then is reduced, thereby reducing alternator output. An increased current in coil 95 causes arm 74 to vibrate between the open position and contact 72, thereby reducing further the average current in the alternator field which in turn reduces further the alternator output. Switch 78 is open normally and is closed by the magnetic field produced by a current in coil 97.

When quick heat is desired, lever 112 is moved to its max position, thereby closing switches 46, 48, 50 and 108 and opening switches 104 and 106. Assuming that the temperature of switch 82 is sufficiently low, switch elements 84 and 86 are out of touch with respective contacts 90 and 96. No current exists in coils 95 and 97 so arm 74 remains in touch with contact 68 to produce unregulated operation of alternator 32, and switch 78 remains open to prevent the unregulated output of alternator 32 from damaging battery 60 or electrical accessories.

The entire unregulated output of alternator 32 then is applied to electric heating element 44 and fan 22 transfers the heat from element 44 to passenger compartment 18.

When the engine cooling system reaches a temperature at which it can supply sufficient heat via heating element 16 to satisfy the needs of the passengers in the passenger compartment, elements 84 and 86 of temperature sensitive switch 82 move into touch with contacts 90 and 96, respectively. A current then flows in coil 95 and the magnetic field produced thereby acts on arm 74 to switch alternator 32 into one of its regulated states of operation depending on the voltage in lead 56. A current then also flows in coil 97 and its magnetic field closes switch 78 to apply the regulated output of alternator 32 to battery 60 which is recharged thereby.

Referring to FIGURE 3, as the temperature of thermistor 116 increases, its resistance decreases to permit a steadily increasing current in coil 95. This provides a smooth transition from the nonregulated to the regulated state of alternator 32. Diode 122 in FIGURE 4 permits the use of a temperature sensitive switch 82' having a single switch element 84, thereby eliminating the need for switch element 86 and switch 106. The FIGURE 4 constructions can be used in either the FIGURE 2 circuit or the FIGURE 3 circuit.

This invention therefore provides a control circuit for an electric heating system that can be incorporated easily into an existing engine coolant heating system with a minimum of material and installation expense. Of course the heating system of this invention also can be incorporated into a vehicle as original equipment. Ordinarily a conventional heater motor control switch is connected in parallel with switch 108 to permit single or variable speed operation of fan motor 22 for the cool and warm settings of temperature control lever 112. A resistor can be connected in parallel with switch 78 to provide some charging of battery 60 while switch 78 is open.

What is claimed is:

1. In an electric heating system for a vehicle having an electric generator, a chargeable electric storage means, a regulator having a voltage regulating relay capable of regulating the output of the generator, and an electric heating element, a control circuit comprising
- a temperature sensitive switch for switching the generator between a regulated and a nonregulated state, said switch being in series with said voltage regulating relay, and
- a manually actuatable switch for switching said temperature sensitive switch into and out of a controlling relationship with the voltage regulating relay.

2. The heating system of claim 1 in which the manually actuatable switch is in parallel with the temperature sensitive switch.

3. The heating system of claim 2 in which the regulator has a connecting relay capable of connecting the generator output to the storage means, and the temperature sensitive switch comprises
- a voltage regulating switch element in series with the voltage regulating relay, and
- a connecting switch element in series with said connecting relay.

4. The heating system of claim 3 comprising a thermistor in parallel with said voltage regulating switch element.

5. The heating system of claim 4 in which the vehicle has an engine coolant heating element anterior to the electric heating element and the thermistor is located between the engine coolant heating element and the electric heating element.

6. The heating system of claim 5 comprising a temperature control movable manually to a maximum heat position, said control operating the manually actuatable switch to switch the temperature sensitive switch into said controlling relationship with the voltage regulating relay when the control is in said maximum heat position.

7. The heating system of claim 1 in which the vehicle has an engine coolant heating element anterior to the electric heating element and the control circuit comprises a thermistor in parallel with the temperature sensitive switch, said thermistor being located between the engine coolant heating element and the electric heating element.

8. The heating system of claim 1 in which the temperature sensitive switch is located posterior to the electric heating element.

9. The heating system of claim 1 comprising a temperature control movable manually to a maximum heat position, said control operating the manually actuatable switch to switch the temperature sensitive switch into said controlling relationship with the voltage regulating relay when the control is in said maximum heat position.

References Cited

UNITED STATES PATENTS

| | | |
|---|---|---|
| 2,088,617 | 8/1937 | Sola. |
| 2,158,733 | 5/1939 | Sola _____ 219—202 X |
| 2,827,540 | 3/1958 | Underwood. |

RICHARD M. WOOD, *Primary Examiner.*

C. L. ALBRITTON, *Assistant Examiner.*

U.S. Cl. X.R.

165—43; 219—202, 489, 505; 307—10, 116